(12) United States Patent
Ishikawa

(10) Patent No.: US 7,170,548 B2
(45) Date of Patent: Jan. 30, 2007

(54) OBSTACLE MONITORING DEVICE USING ONE-DIMENSIONAL SIGNAL

(75) Inventor: Takahiro Ishikawa, Pittsburgh, PA (US)

(73) Assignee: Denso Corporation, Kariya (JP)

( * ) Notice: Subject to any disclaimer, the term of this patent is extended or adjusted under 35 U.S.C. 154(b) by 765 days.

(21) Appl. No.: 10/302,956

(22) Filed: Nov. 25, 2002

(65) Prior Publication Data

US 2003/0099400 A1  May 29, 2003

(30) Foreign Application Priority Data

Nov. 26, 2001  (JP)  ............... 2001-359412

(51) Int. Cl.
  *A47G 23/02* (2006.01)
  *G06K 9/46* (2006.01)
(52) U.S. Cl. ...................... 348/148; 382/190
(58) Field of Classification Search ........ 348/148–149;
  382/104, 106–107, 190, 103; 340/937; 701/301;
  A47G 23/02; G06K 9/46
  See application file for complete search history.

(56) References Cited

U.S. PATENT DOCUMENTS

| 5,521,633 | A |   | 5/1996 | Nakajima et al. |
|---|---|---|---|---|
| 5,537,110 | A | * | 7/1996 | Iida et al. ................. 340/942 |
| 5,717,792 | A | * | 2/1998 | Poggio et al. ............. 382/278 |
| 5,751,211 | A | * | 5/1998 | Shirai et al. .............. 340/435 |
| 5,771,485 | A | * | 6/1998 | Echigo ..................... 701/119 |
| 5,835,880 | A | * | 11/1998 | Gan et al. ................ 701/205 |
| 5,847,755 | A | * | 12/1998 | Wixson et al. ............ 348/149 |
| 6,243,482 | B1 | * | 6/2001 | Eibert et al. ............... 382/103 |
| 6,434,254 | B1 | * | 8/2002 | Wixson ..................... 382/103 |
| 6,636,257 | B1 | * | 10/2003 | Harada et al. ............. 348/148 |
| 6,990,253 | B2 | * | 1/2006 | Takeda et al. ............. 382/276 |
| 2001/0046310 | A1 | * | 11/2001 | Shima ...................... 382/107 |
| 2002/0028001 | A1 | * | 3/2002 | Doi et al. ................. 382/103 |
| 2005/0196034 | A1 | * | 9/2005 | Hattori et al. ............. 382/154 |
| 2006/0015252 | A1 | * | 1/2006 | Yamamoto et al. ......... 701/301 |

FOREIGN PATENT DOCUMENTS

| JP | A-S52-100258 | 8/1977 |
|---|---|---|
| JP | A-S57-3166 | 1/1982 |
| JP | A-H6-107096 | 4/1994 |

(Continued)

OTHER PUBLICATIONS

De Micheli et al, "Vehicle Guidance from One Dimensional Optical Flow", IEEE, Intelligent Vehicles '93 Symposium, pp. 183-188, Jul. 1993.*

(Continued)

*Primary Examiner*—Tung Vo
(74) *Attorney, Agent, or Firm*—Posz Law Group, PLC

(57) ABSTRACT

Luminous values of pixels of coordinates previously set as an obstacle presence line are inputted to a memory as a one-dimensional signal converted from a two-dimensional image signal taken by a camera. A portion of the line has a luminous value other than a luminous value predicted as a luminous value of a normal road. The portion of the line is then extracted as a vehicle candidate range. Further, based on characteristic of the vehicle such as a vehicle width or a relative speed, presence or absence of the vehicle is determined by removing noise from the extracted vehicle candidate range.

5 Claims, 10 Drawing Sheets

FOREIGN PATENT DOCUMENTS

| | | |
|---|---|---|
| JP | A-H07-294251 | 11/1995 |
| JP | A-H8-142868 | 6/1996 |
| JP | A-H9-240397 | 9/1997 |
| JP | A-2000-075032 | 3/2000 |
| JP | A-2000-285245 | 10/2000 |
| JP | A-2001-209787 | 8/2001 |

OTHER PUBLICATIONS

Examination Report issued from Japanese Patent Office issued on Jan. 31, 2006 for the corresponding Japanese patent application No. 2001-359412 (a copy and English translation thereof).

Notice of Reason for Rejection from Japanese Patent Office issued on May 12, 2006 for the corresponding Japanese patent application No. 2001-359412 (a copy and English translation thereof).

* cited by examiner

OBSTACLE LINE

EX 2 : CITY BLOCK DISTANCE

□ ROAD  ▨ VEHICLE

FIG. 7B1
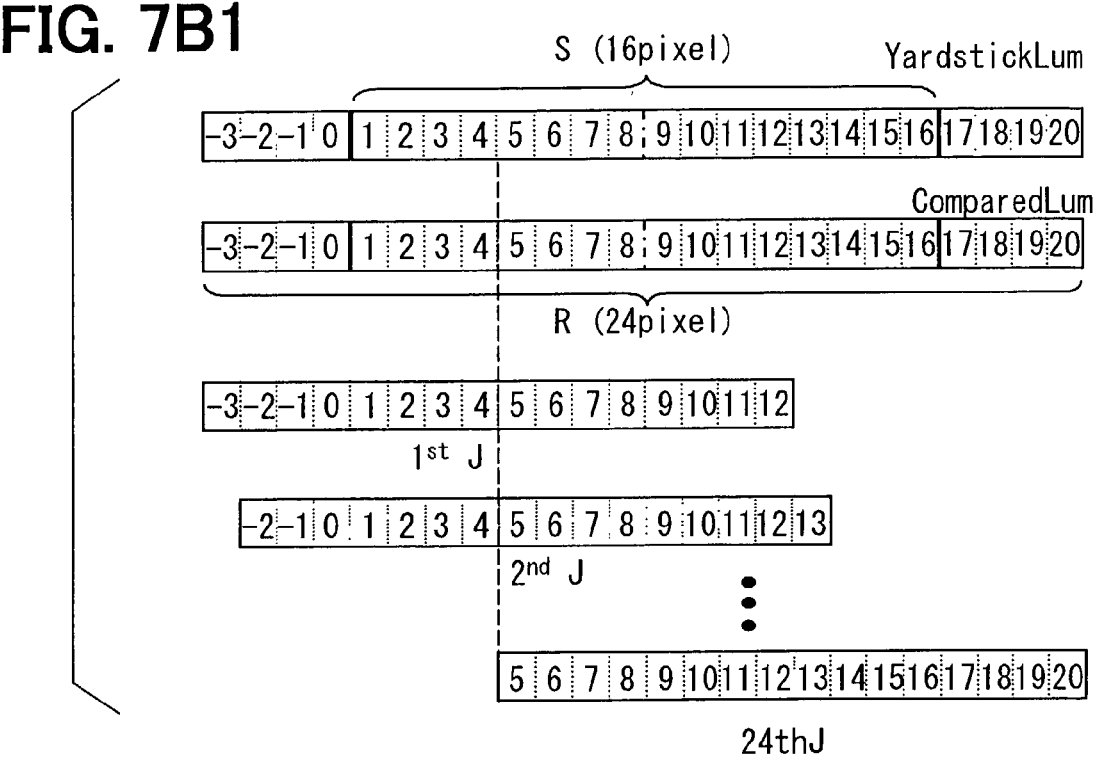
FIG. 7B2
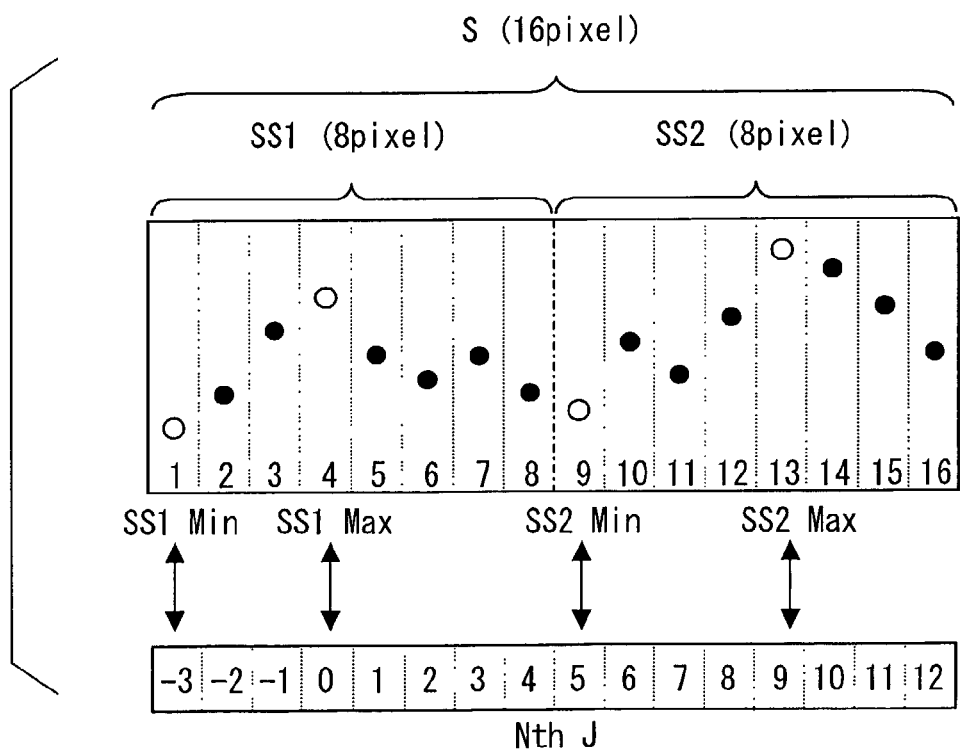

| CANDIDATE | DIRECTION |
|---|---|
| VEHICLE | APPROACH |
| PAINT | DEPART |
| SHADOW | DEPART |

OBSTACLE MONITORING DEVICE USING ONE-DIMENSIONAL SIGNAL

CROSS REFERENCE TO RELATED APPLICATIONS

This application is based on and incorporates herein by reference Japanese Patent Application No. 2001-359412 filed on Nov. 26, 2001.

FIELD OF THE INVENTION

The present invention relates to an obstacle monitoring device provided in a vehicle, which uses a one-dimensional signal so that it saves memory resources to realize real time performance and low cost.

BACKGROUND OF THE INVENTION

There are known obstacle monitoring devices for detecting an obstacle by monitoring a predetermined area from driver's own vehicle. An instance is 'Vehicular forward monitoring method' described in JP-A-H6-107096 with regard to monitoring of a forward area. Another is 'Device of informing rearward or side vehicle' described in JP-A-H9-240397 or 'Collision preventing device, collision preventing method of a moving body, and record medium' described in JP-P2000-285245A with regard to monitoring of rearward and side areas. According to the monitoring devices, there are used images in a forward direction or rearward and side directions taken by a video camera installed at an own vehicle. Further, real time performance is intended by extracting an object area from the images and carrying out an obstacle detecting processing by restricting the processing to the object area.

According to the 'Vehicular forward monitoring method' described in JP-A-H6-107096, a very small area is set on a straight line present on an own vehicle running lane and a periphery thereof and is generated from a focus of expansion (FOE). Another foregoing vehicle is detected by paying attention to the very small area having an optical flow which is a motion emerging from the FOE.

Further, according to the 'Collision preventing device, collision preventing method of a moving body and record medium' described in JP-P2000-285245A, a very small area is set on a straight line present on a contiguous lane and a periphery thereof and is generated from a FOE. Another vehicle approaching from rear or side direction is detected by paying attention to the very small area having an optical flow which is motion emerging from a FOE. Another vehicle is recognized as another object by projecting the optical flow to a parameter space and merging areas.

Further, according to 'Device of informing rearward or side vehicle' described in JP-A-H9-240397, another vehicle approaching from rearward or side direction is detected by applying Hough conversion to time space images produced by time-sequentially aligning line areas in consecutive frames.

However, processing objects in the above methods are two-dimensional areas, that are, images. Another approaching vehicle which is an obstacle is detected by applying an image processing method of a processing of calculating an optical flow, merging of areas or Hough conversion to the two-dimensional area. Even when a processing range is limited, the image processing method detecting the object by the two-dimensional area is invariably applied and operation load is considerable. Further, when pixel values in the processing object range which is the two-dimensional area are calculated, the pixel values must be held in a memory and therefore, a capacity of the memory used is necessarily increased. Further, for example, when the obstacle monitoring device is constituted by a plurality of parts, data of an amount of two-dimensional area must be exchanged among the parts and an amount of communication is increased. Therefore, there poses a problem that such a method is not suitable yet for a device requesting high real time performance as in preventing collision of a vehicle and having a cost enabling to mount on a vehicle. Further, such a problem is posed also in the case of detecting various obstacles other than detecting a vehicle.

SUMMARY OF THE INVENTION

It is an object to provide an obstacle monitoring device, being provided in a vehicle, capable of reducing an amount of operation, an amount of memory and an amount of communication in detecting an obstacle from a two-dimensional image. This thereby enables real time formation of a processing and low cost formation of a realized device.

To achieve the above and other objects, an obstacle monitoring device is provided with imaging means for taking an image of a predetermined area, one-dimension extracting means for extracting a one-dimensional signal from the image, and obstacle detecting means for determining presence or absence of an obstacle based on the one-dimensional signal.

BRIEF DESCRIPTION OF THE DRAWINGS

The above and other objects, features and advantages of the present invention will become more apparent from the following detailed description made with reference to the accompanying drawings. In the drawings:

FIGS. 7A to 7C2 are graphs and diagrams for estimating a relative speed by calculating a correlation;

DETAILED DESCRIPTION OF THE PREFERRED EMBODIMENTS

Figure 1A:
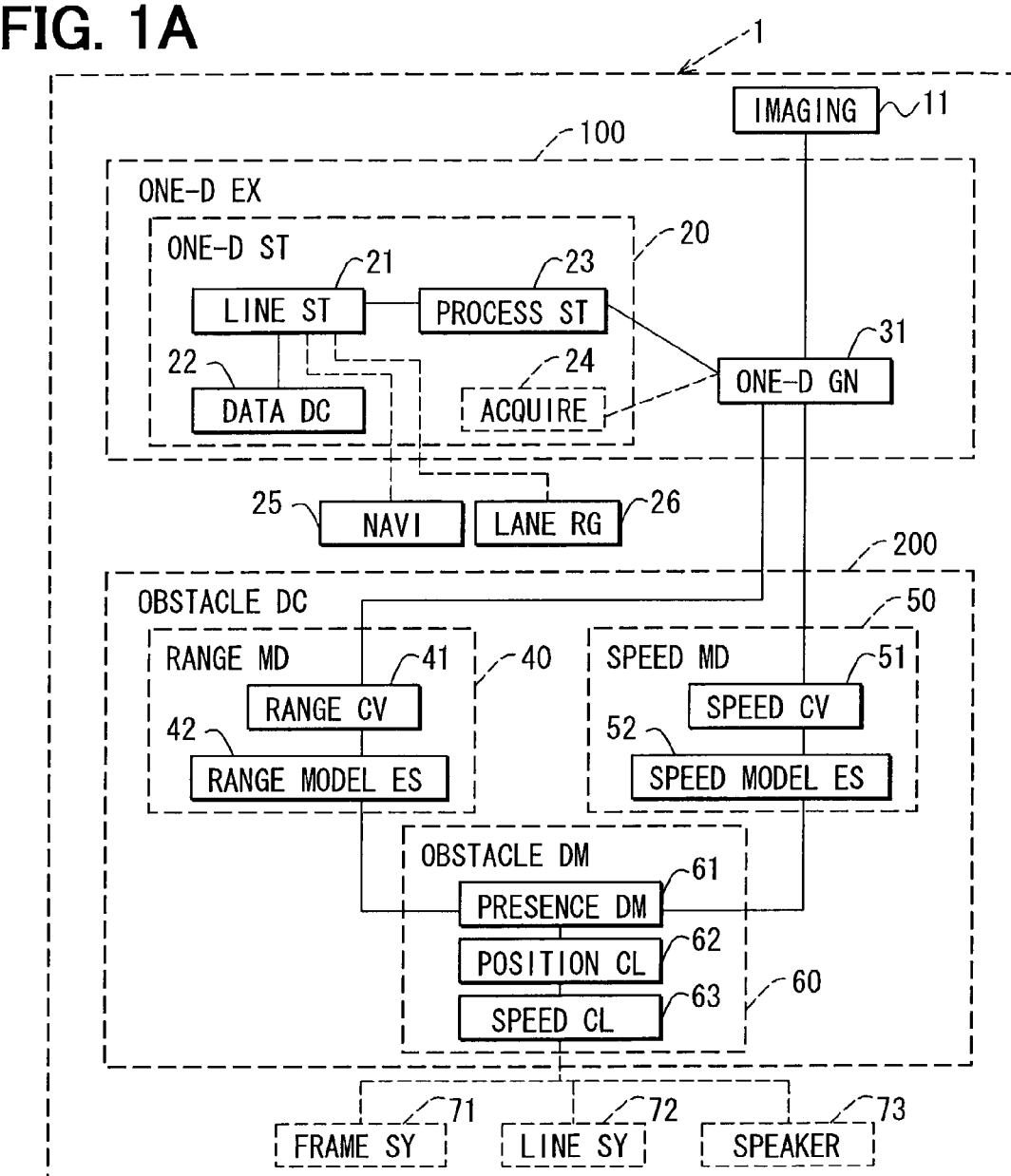
FIGS. 1A and 1B are block diagrams for showing a structure of an obstacle monitoring device according to an embodiment.

An obstacle monitoring device 1 according to an embodiment is mounted on a vehicle and comprises imaging means 11 constituted by a video camera, and one-dimension extracting means (ONE-D EX) 100 and obstacle detecting means (OBSTACLE DC) 200 constituted by a microcomputer as shown in FIG. 1A. The microcomputer comprises CPU, ROM, RAM, I/O and a peripheral circuit connected to I/O and the peripheral circuit comprises a timer and an input/output circuit. Further, the input/output circuit comprises an A/D converter for inputting an image signal. It can also input a pixel value corresponding to a designated pixel in the image signal taken by the imaging means 11 to memory as digital data.

Programs for realizing functions of the one-dimension extracting means 100 and the obstacle detecting means 200, are stored in ROM of the microcomputer and the functions of the one-dimension extracting means 100 and the obstacle detecting means 200 are realized by executing processings by CPU in accordance with the programs.

As shown in FIG. 1A, the one-dimension extracting means 100 comprises one-dimension generating means (ONE-D GN) 31 and one-dimension setting means (ONE-D ST) 20. The one-dimension generating means 31 generates a one-dimensional signal from the image signal inputted from the imaging means 11 based on a converting method set by the one-dimension setting means 20. The one-dimension setting means 20 comprises data detecting means (DATA DC) 22, line setting means (LINE ST) 21 and process setting means (PROCESS ST) 23. The process setting means 23, determines a method of converting an image into a one-dimensional signal based on a line set by the line setting means 21. The line setting means 21 corrects the line according to an own vehicle speed and a steering angle detected by the data detecting means 22. Further, acquiring means 24 may be provided in the one-dimension setting means and connected with the process setting means 23. It is for acquiring data related to an object of taking the image. Navigation means 25 may be connected with the line setting means 21. It is for calculating a current position of the own vehicle and map information around the current position. Lane recognizing means 26 may be connected with the line setting means 21. It is for recognizing a traffic lane in the image taken by the imaging means 11.

All the pixels of the image taken by the imaging means 11 are not used in a processing at a later stage. The image is converted into a one-dimensional signal by the one-dimension generating means 31 in accordance with a converting method set by the process setting means 23. The process setting means 23 is for determining a method of converting the image into the one-dimensional signal based on the area set by the line setting means 21.

Further, the obstacle detecting means 200 comprises range modeling means (RANGE MD) 40, speed modeling means (SPEED MD) 50 and obstacle determining means (OBSTACLE DM) 60.

The range modeling means 40 comprises range converting means (RANGE CV) 41 and range model estimating means (RANGE MODEL ES) 42. The range converting means 41 converts the one-dimensional signal provided by the one-dimension generating means 31 into the one-dimensional signal masking a road area and extracting only a vehicle candidate range. Further, the range model estimating means 42 estimates a relative position model of a vehicle candidate range based on the one-dimensional signal provided by the range converting means 41.

Meanwhile, the speed modeling means 50 comprises speed converting means (SPEED CV) 51 and speed model estimating means (SPEED MODEL ES) 52. The speed converting means 51 converts the one-dimensional signal provided by the one-dimension generating means 31 into the one-dimensional signal masking the road area and extracting only the vehicle candidate range. Further, the speed model estimating means 52 estimates the relative speed based on the one-dimensional signal at a current frame provided by the speed converting means 51 and the one-dimensional signal at a frame which is past from present by a certain frame amount.

Further, the obstacle determining means 60 comprises vehicle presence determining means (PRESENCE DM) 61 as obstacle presence determining means specified in the scope of claims, vehicle position calculating means (POSITION CL) 62 as obstacle relative position calculating means and vehicle speed calculating means (SPEED CL) 63 as obstacle relative speed calculating means.

The vehicle presence determining means 61 determines presence or absence of a rearward or side vehicle based on a relative position model which is a vehicle candidate range and a relative speed model provided by the range model estimating means 42 and the speed model estimating means 52.

The vehicle position calculating means 62 calculates a relative position of a vehicle as an obstacle based on an end point of the range of the relative position of the vehicle candidate range (obstacle candidate body) determined as the vehicle by the vehicle presence determining means 61.

Further, the vehicle speed calculating means 63 calculates a relative speed relative to the vehicle as obstacle based on the relative speed of the vehicle candidate range (obstacle candidate body) determined as the vehicle by the vehicle presence determining means 61 and a peripheral area thereof.

In this way, presence or absence of the obstacle can be determined based on the one-dimensional signal generated based on the image provided from the imaging means 11 and the relative position and the relative speed of the obstacle can be calculated. Therefore, it is not necessary to input a total of the image to a frame memory and the processing can be executed by inputting, for example, only signals of pixels in correspondence with specific pixels set as the line. In this way, the memory for calculating presence or absence, position and speed of the obstacle can be reduced while the operation amount and the cost can be reduced.

Next, an explanation will be given of an example of monitoring a vehicle running on a contiguous lane and overtaking a driver's own vehicle (hereinafter, referred to as rear or side vehicle) from an image taking a rear or side area of the own vehicle. The example applies the obstacle monitoring device 1 to rear or side vehicle recognizing application.

Figure 2:
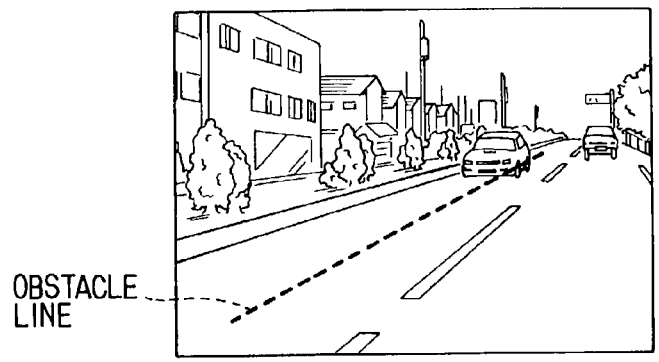
FIG. 2 is a view for showing an obstacle presence line.

The imaging means 11 is mounted on a door mirror of the own vehicle and installed to take the rear or side area of the own vehicle as shown in FIG. 2. An explanation will mainly be given of a flow of processings of the one-dimension extracting means 100 and the obstacle detecting means 200.

1) An image taking the rear or side area of the own vehicle is provided by the imaging means 11.

2) The line setting means 21 set a suspected line based on the image taken by the imaging means 11. On the suspected line, the rear or side vehicle is suspected to be present (referred to FIG. 2). Here, a line range remote from the own vehicle by a predetermined distance is corrected in a pertinent lane shape in accordance with the own vehicle speed and the steering angle provided by the data detecting means 22. For example, the line range are a center line area of a contiguous lane or a line range present at a position remote from a white line of a running lane to the contiguous lane by a distance in correspondence with ⅓ of a width of the running lane.

These can be calculated by conversion of projection by a lane width or a camera parameter, a scene of the taken image is fixed to some degree and therefore, the line may be set by looking at the image.

Figure 3A:
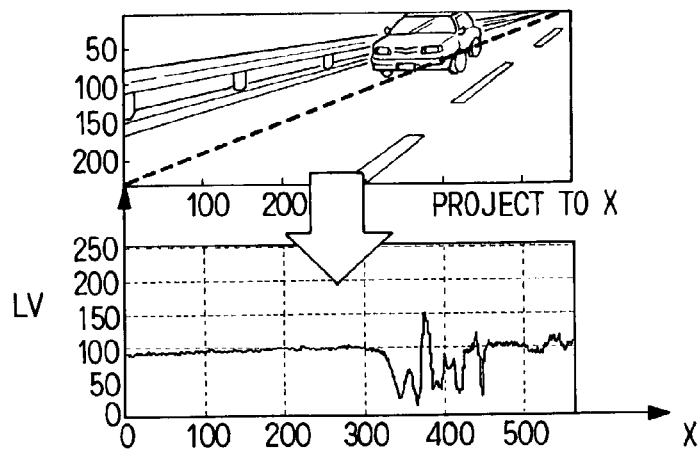
FIGS. 3A to 3C are a view and graphs for setting one-dimensional signal extracting method.
Figure 3B:
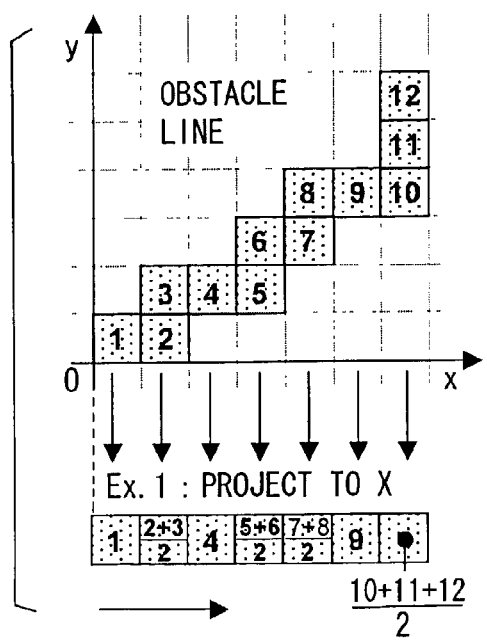

3) The process setting means 23 set a method of converting the image taken by the imaging means 11 into a one-dimensional signal is set. Here, the method is 'projecting to X-axis direction a pixel present on the suspected line to obtain a one-dimensional signal'. Further, the one-dimension generating means 31 converts the image into the one-dimensional signal in accordance with the method (refer to FIGS. 3A and 3B). Pixels described with numerals in FIG. 3B are pixels set as the obstacle presence line. Projection of values of the pixels to X-axis and averaging of image values thereof generates the one-dimensional signal shown in arrow mark directions. For example, luminous values (LV) of pixels of coordinates set as the obstacle presence line are inputted from image signals from time to time by using synchronizing signals in the image signals. This dispenses with a frame memory equivalent to a size of the image and considerably reduces a necessary memory.

For example, there is needed a memory of about 100 KB when a processing is executed by inputting a total of an image of cif style of 352 pixels×288 pixels×1 byte by the conventional method. Meanwhile, when the above-described line is inputted as a diagonal line of the cif image, sqrt(352 pixels×352 pixels+288 pixels×288 pixels)×1 byte=455 byte and the processing can be executed by a memory capacity of one 200-th. Further, when an operation is carried out based on the one-dimensional signal, an operational amount can considerably be reduced. For example, in the case of the above-described cif image, when a processing is executed by dividing the image into blocks of 8 pixels×8 pixels by the conventional method, the above-described image can be divided into 1584 blocks. Further, when a processing of searching a corresponding block is carried out in a range of 32 pixels×32 pixels, it is necessary to execute the processing with regard to 1584 blocks× 32 pixels×32 pixels=1622000 processing units. In contrast thereto, in the case in which the processing is executed based on the one-dimensional signal by constituting the line by the diagonal line of the image, when the diagonal line is divided into blocks of 8 pixels, 57 blocks are constituted and when the processing of searching a corresponding block is executed within a range of 32 pixels, 57 blocks×32 pixels=1824 processing units are constituted and a number of the processing units of this method is one 880-th of the conventional example. In this way, an operation amount can considerably be reduced compared with that of the conventional example.

4) The range converting means 41 converts into a one-dimensional signal the one-dimensional signal generated by the one-dimension generating means 31. Here, only a vehicle candidate range is extracted by masking a range of the luminous value of the road area using the fact that the luminous value of the road area has already been known. Specific processings are described in 4a) through 4c) described below.

Figure 4A:
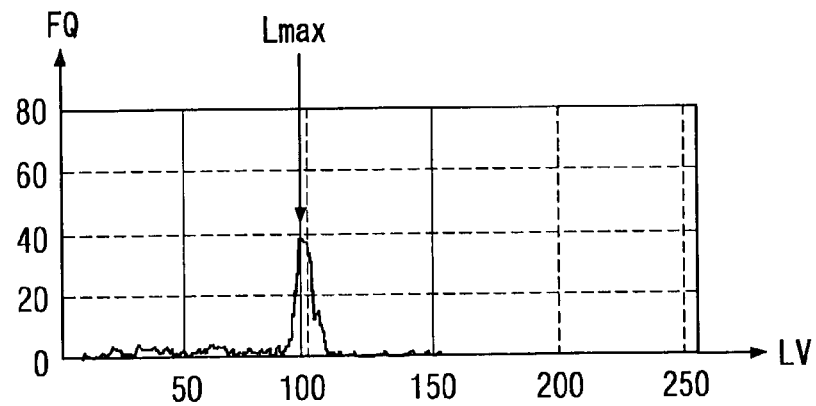
FIGS. 4A to 4C are graphs for dividing a road area.

4a) There is formed a histogram of a luminous value of a one-dimensional luminous signal OrgLum generated by the one-dimension generating means 31 and a luminous value Lmax having a maximum frequency (FQ) is searched. (See FIG. 4A)

Figure 4B:
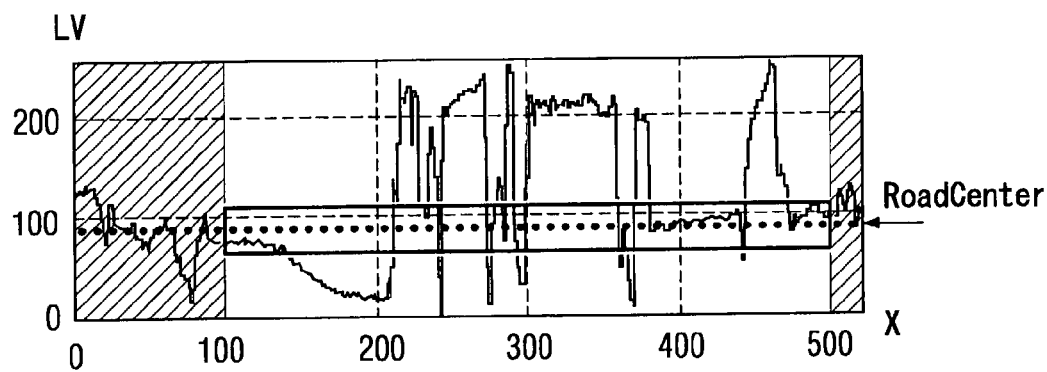

4b) The luminous value Lmax is determined whether it is in a known (reference) luminous value range of the road area (RoadLower≦L≦RoadUpper). Here, a luminous value RoadCenter is in the center of the known luminous value range of the road area. A luminous value Roadwidth is one half of the known luminous value range of the road area. When the Lmax falls in the known luminous value range (RoadLower≦L≦RoadUpper) which is predicted to be the road area, the RoadCenter is modified to the Lmax. Here, the Roadwidth is not modified. When the Lmax falls outside of the predicted range, the Roadcenter is not modified. The luminous value range of the road range is thereby set by an updated luminous value range ((RoadCenter-Roadwidth) ≦L≦(RoadCenter+Roadwidth) using the updated Road-Center. (See FIG. 4B) Incidentally, the known luminous value range of the road area (RoadLower≦L≦RoadUpper) is previously obtained as a reference value by using the same procedure described in above 4a) in a condition where no obstacle are present on a typical road area.

Figure 4C:
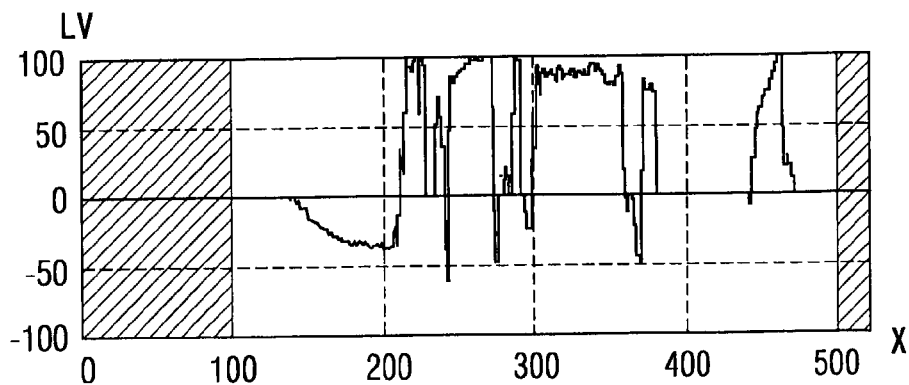

4c) The one-dimensional luminous signal OrgLum is subjected to a threshold processing based on the luminous value area ((RoadCenter-Roadwidth)≦L≦(RoadCenter+ Roadwidth)) of the road area to thereby provide the one-dimensional signal TranLum removed of the road area. (See FIG. 4C)

The threshold processing is executed as follows.
Luminous value in road area:

(RoadCenter−Roadwidth)≦*OrgLum*(*t*)≦(Road-
Center+Roadwidth) *TranLum*(*t*)=0

Luminous value more than luminous value of road area:

(RoadCenter+Roadwidth)<*OrgLum*(*t*) *TramLum*(*t*)
=luminous value *OrgLum*(*t*)−Road Area upper
limit luminous value(RoadCenter+Roadwidth)

Luminous value less than luminous value of road area:

*OrgLum*(*t*)<(RoadCenter−Roadwidth) *TranLum*(*t*)
=luminous value *OrgLum*(*t*)−Road Area lower
limit luminous value(RoadCenter−Roadwidth)

Figure 5A:
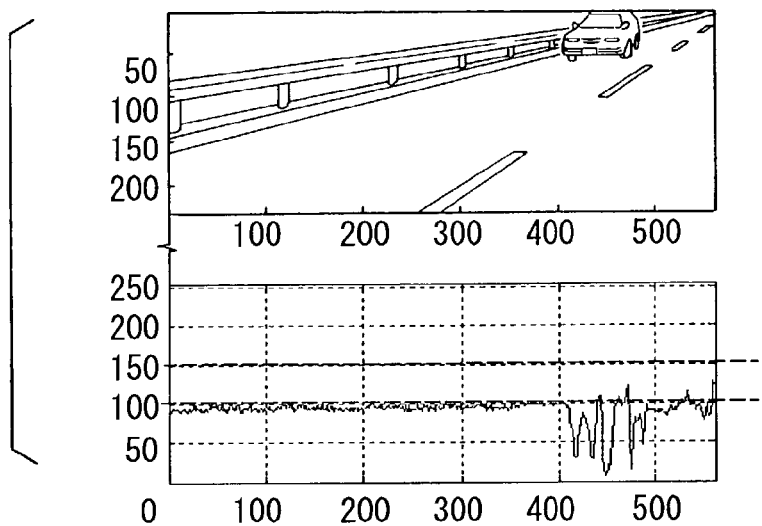
FIG. 5 is views and graphs for showing examples of road area luminous values.
Figure 5B:
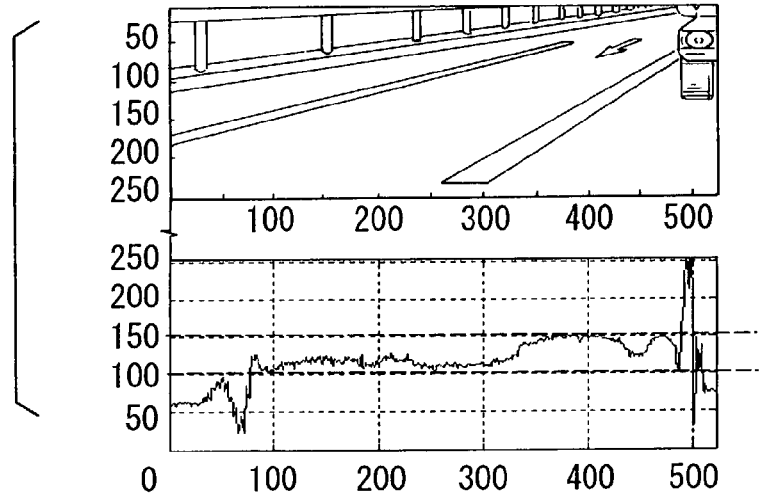
Figure 5C:
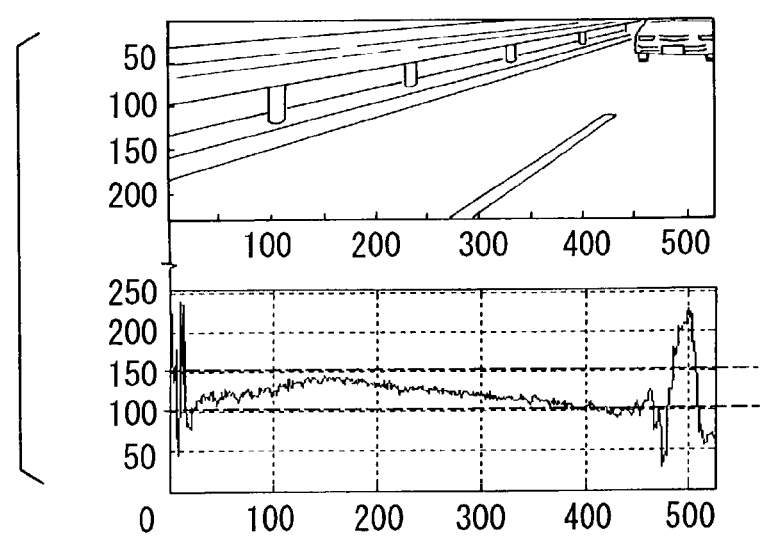

The reason of executing the above-described processing is for adapting to a variation of the luminous value range showing the road area caused by very small change of environment as shown in FIG. 5. Further, the reason of adopting the histogram at the above-described processing 4a), is for expressing disturbance information in the one-dimensional signal as much as possible.

5) The range model estimating means 42 converts the vehicle candidate range into a model expressed by two points of area end points based on the one-dimensional signal TranLum generated by the range converting means 41. Specific processings are described in 5a) through 5c).

Figure 6A:
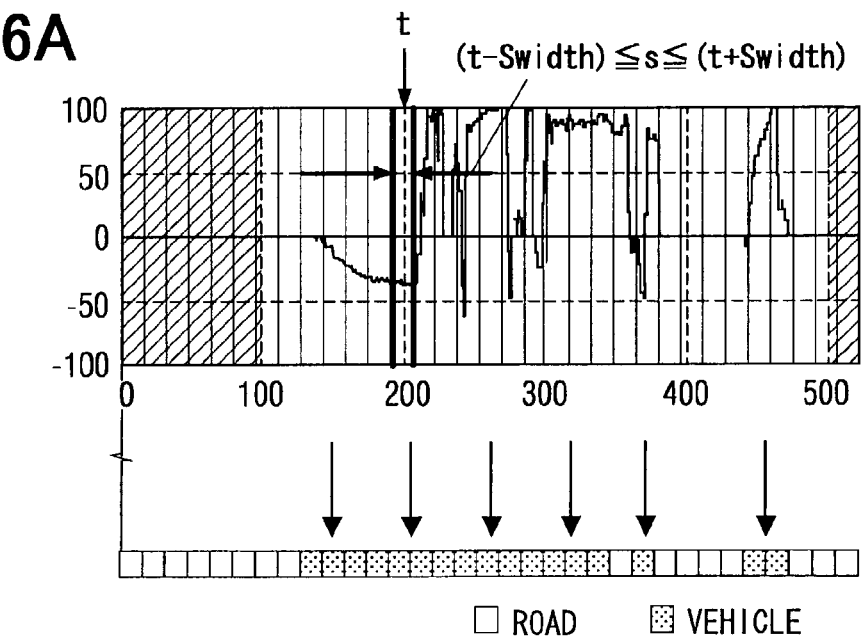
FIGS. 6A to 6C are graphs and diagrams for individually dividing a vehicle candidate range.

5a) The one-dimensional luminous signal TranLum removed of the road area by the above-described processing 4) is divided into divisions S (t-Swidth<S≦t+Swidth; t designates area center point) each having a width (2×Swidth) (the signal may be divided such that the divisions overlap). In the division S, there is calculated a point number ZeroPNum of the luminous value TranLum (s) indicating 0 (road area). Further, when the ZeroPNum is less than a half number Swidth of the division, a Label(T) of the division S is labeled as 'vehicle candidate', otherwise, the Label(T) of the division S is labeled as 'road'. (See FIG. 6A)

Figure 6B:
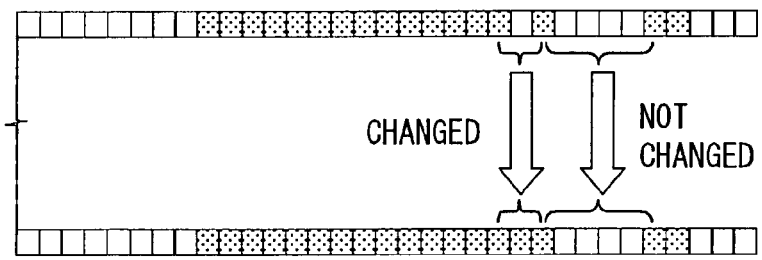

5b) The one-dimensional signal Label indicating a result of labeling is scanned and when a size of a 'road' label range interposed by 'vehicle candidate' labels is smaller than a threshold ThresCarSR, the 'road' label is changed to the 'vehicle candidate' label to thereby form a group. Here, one-dimensional signal indicating a corrected result of labeling is designated by ModLabel. (See FIG. 6B)

Figure 6C:
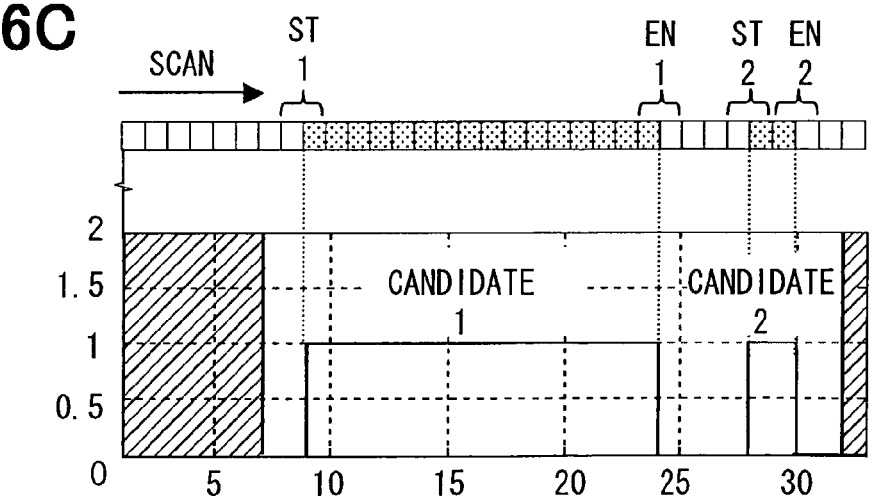

5c) The one-dimensional signal ModLabel indicating the corrected result labeling is scanned, a point to which 'road' is changed to 'vehicle candidate' is defined as a start point (ST) of a vehicle candidate, a point at which 'vehicle candidate' is changed to 'road' is defined as an end point (EN) of a vehicle candidate. The model of the vehicle candidate range is expressed by using the one-dimensional luminous signal by two range end points of the start point and end point. (See FIG. 6C)

The reason of adopting above-described processing 5b) is for relieving a case of being obliged to mask a point as road area although the point constitutes the vehicle candidate area at a periphery of a point at which sign of the one-dimensional luminous signal TranLum is changed. The reason of expressing the model of the vehicle candidate range by two points of the range end points in the processing 5c) is for directly calculating a front relative position and an end relative position of the vehicle candidate range.

6) The speed converting means 51 converts the one-dimensional signal OreLum generated by the one-dimensional signal generating means 31 into the one-dimensional signal TranLum with extracting only the vehicle candidate area by masking the road area. Here, the luminous value of the road area has already been known. According to the embodiment, the speed converting means 51 executes a processing similar to that of the range converting means 41 and therefore, the range converting means 41 substitutes for the speed converting means 51. That is, the speed converting means 51 executes the same processing as the road area dividing processing shown in the above-described 4a). By the processing, disturbance of the vehicle candidate range in the one-dimensional luminous signal can be changed to be conspicuous. Accordingly, accuracy of correlation calculation at later stage is improved.

7) The relative speed is estimated by calculating a correlation by the speed model estimating means 52 by using a one-dimensional signal at time t converted by the speed converting means 51 (hereinafter, compared one-dimensional luminous signal ComparedLum) and one-dimensional luminous signal at time t-Δt (hereinafter, reference one-dimensional luminous signal YardstickLum). Specific processings are described in 7a) through 7c).

Figure 7A:
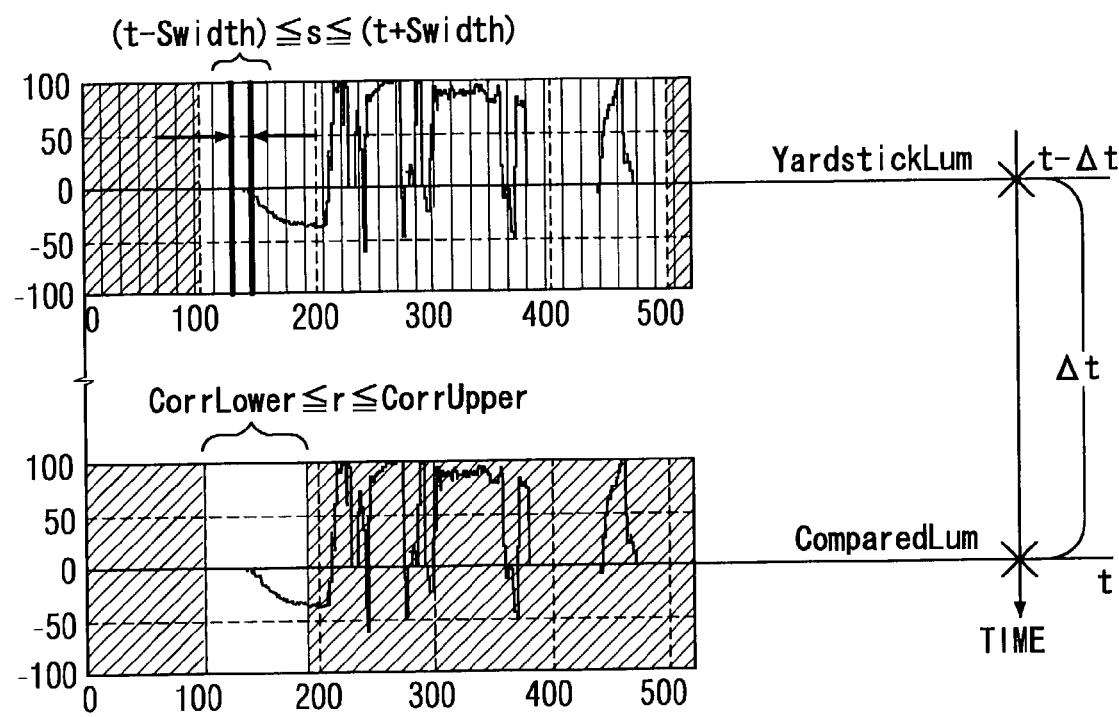

7a) The one-dimensional luminous signal at time t removed of the road area by the above-described processing 6) is prepared as the compared one-dimensional luminous signal ComparedLum and the one-dimensional luminous signal at time t−Δt removed of the road area is prepared as the reference one-dimensional luminous signal YardstickLum. The reference one-dimensional luminous signal YardstickLum is divided into divisions S (t−Swidth<s≦t+Swidth; t designates a center point of division) each having a width (2×Swidth) similar to those of the range model estimating means 42. Next, a correlation calculation range R (CorrLower≦r≦CorrUpper) of the compared one-dimensional luminous signal ComparedLum is set for each of the divisions S of the reference one-dimensional luminous signal YardstickLum. (See FIG. 7A)

7b) An object division in the reference one-dimensional luminous signal YardstickLum is defined as S (t−Swidth<s≦t+Swidth; t designates a division center point). In the correlation calculation range R (CorrLower≦r≦Corrupper) in a compared one-dimensional luminous signal ComparedLum, the compared division J (i−Swidth<j≦i+Swidth) is set while shifting a compared division center point i by a unit of point. Then, a correlation between the object division S and the compared division J is calculated. (FIG. 7B1) A detailed flow of correlation calculation used in the embodiment is described below referring to FIG. 7B2.

i) The object division S is divided into two subdivisions SS1 and SS2.

ii) In each of the subdivisions SS1 and SS2, points taking a maximum value and a minimum value of the luminous value are defined as characteristic points. That is, in the object division S, four characteristic points (SS1Min, SS1Max, SS2Min, SS2Max) are extracted.

iii) A difference of absolute values of the luminous value at the characteristic point extracted in the object division S and the luminous value at a point in correspondence with the characteristic point in the compared division J, is calculated for each of the four characteristic points and a total sum of differences of the absolute values at the four characteristic points is calculated.

iv) The compared division J minimizing the total sum of the differences of the absolute values is corresponded as the mostly correlated division Jmax.

7c) By calculating a difference between a division center point imax at the mostly correlated compared division Jmax and a division center point i as object division S as a result of the correlation calculation, a moving amount per unit time, that is, the relative speed is calculated. (See FIGS. 7C1 and 7C2)

Further, a number of methods other than the above-described are present in the correlation calculation of the processing 7b) and therefore, the methods may be used.

Figure 8:
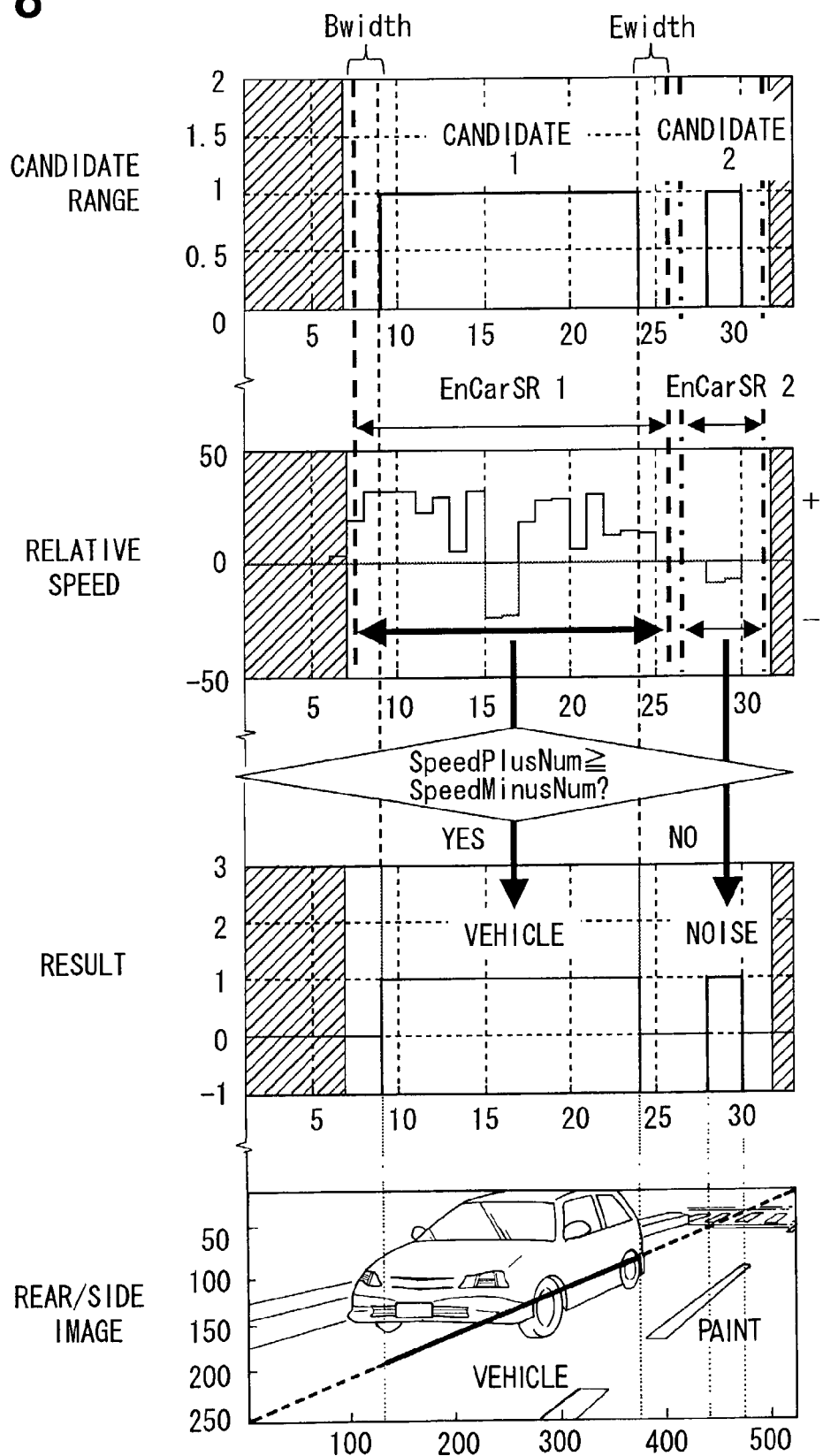
FIG. 8 is a view and graphs for detecting out a vehicle.

8) The vehicle presence determining means 61 determines presence or absence of the rear or side vehicle based on the relative range model of the obstacle candidate range provided by the range model estimating means 42 and the relative speed model provided by the speed model estimating means 52. Further, when the rear or side vehicle is present, a relative position from the own vehicle to the rear or side vehicle is calculated by the vehicle position calculating means 62 and a relative speed from the own vehicle is calculated by the vehicle speed means 63. Specific processings are described below (refer to FIG. 8).

Figure 9:
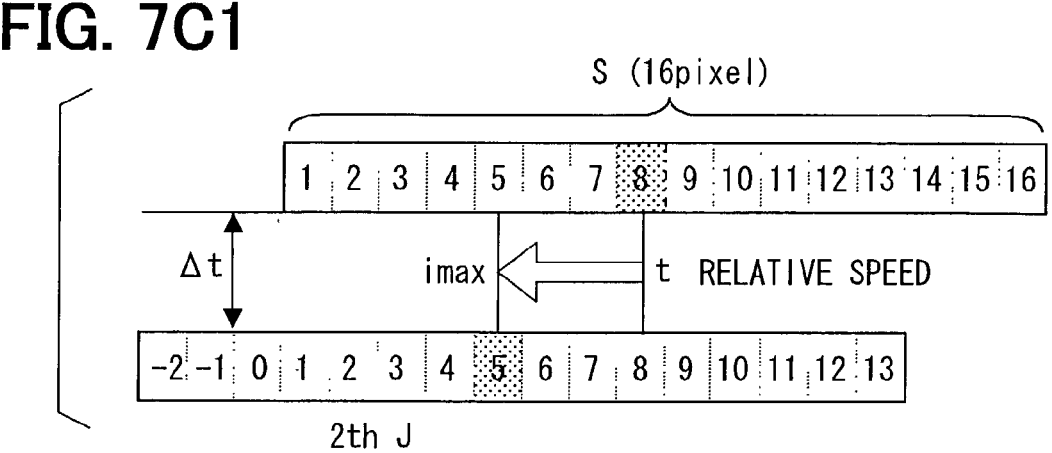
FIG. 9 is a table for showing a direction of a relative speed for respective object.
Figure 9:
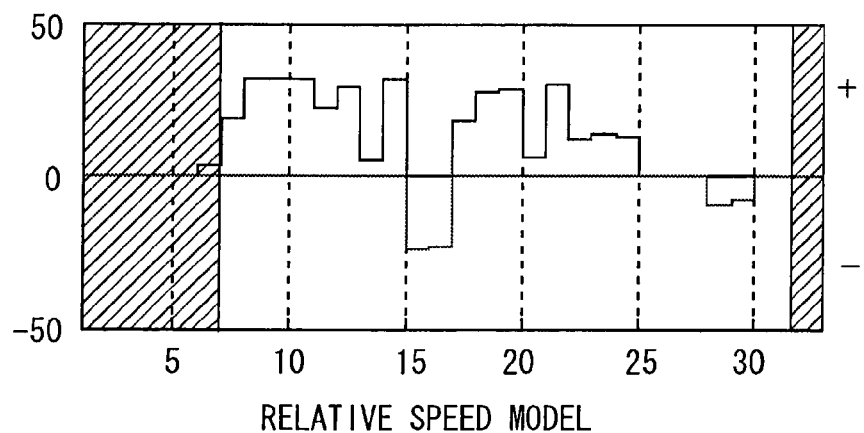

8a) The vehicle candidate range (vehicle/paint/shadow or sunny side) and a direction of the relative speed is brought into a relationship as shown in FIG. 9. That is, while the vehicle (including a vehicle's shadow) which is the obstacle is approaching (+) the own vehicle, paint, a stationary object's shadow or a sunny side is departing (−) from the own vehicle in accordance with running of the own vehicle. Based on the relationship, the rear or side vehicle (vehicle approaching the own vehicle from rear or side direction) is determined from the vehicle candidate range by using the relative speed provided by the speed model estimating means 52.

In particular, first, there is set an area EnCarSR produced by expanding from the start point of the respective vehicle candidate range provided by the range model estimating means 42 in the above-described 5) by a width Bwidth and from the end point by a width Ewidth. Next, there are calculated a total number SpeedPlusNum of divisions indicating the direction of approaching the own vehicle and a total number SpeedMinusNum of divisions indicating the direction of separating from the own vehicle. The both total numbers are calculated with regard to the relative speed of the respective divisions (portions) provided by the speed model estimating means 52 of the expanded area EnCarSR. Further, when the total number SpeedPlusNum is equal to or larger than the total number SpeedMinusNum, the vehicle candidate range is detected as an overtaking vehicle, that is, 'object to be alarmed'. Otherwise, the vehicle candidate range is detected as 'stationary body', that is, noise. 20.

8b) The vehicle position calculating means 62 then calculates a relative position of the obstacle based on a range end point of the range determined as the obstacle by the vehicle presence determining means 61. Here, by converting through projecting the end point a relative position in a real space is calculated. Otherwise, by using a look-up table corresponding between an image and real space the relative position can be obtained from the end point.

8c) Also, the vehicle speed calculating means 63 calculates a relative speed of the obstacle based on a relative speed of the range determined as the obstacle by the vehicle presence determining means 61. Here, a one-dimensional flow of each point of the obstacle range is synthesized to obtain the relative speed of the obstacle. The synthesis can be applied to the relative speed in the real space after being converted from the one-dimensional flow or to the one-dimensional flow before being converted to the relative speed in the real space. The conversion to the real space can be done using projection or referring to the look-up table.

8d) When the object to be alarmed is detected, alarm sound is emitted from a speaker 73 (shown in FIG. 1A) connected to the microcomputer of the obstacle monitoring device 1. In this way, by the processing based on the one-dimensional signal, presence of an overtaking vehicle can be notified to a driver.

Figure 10:
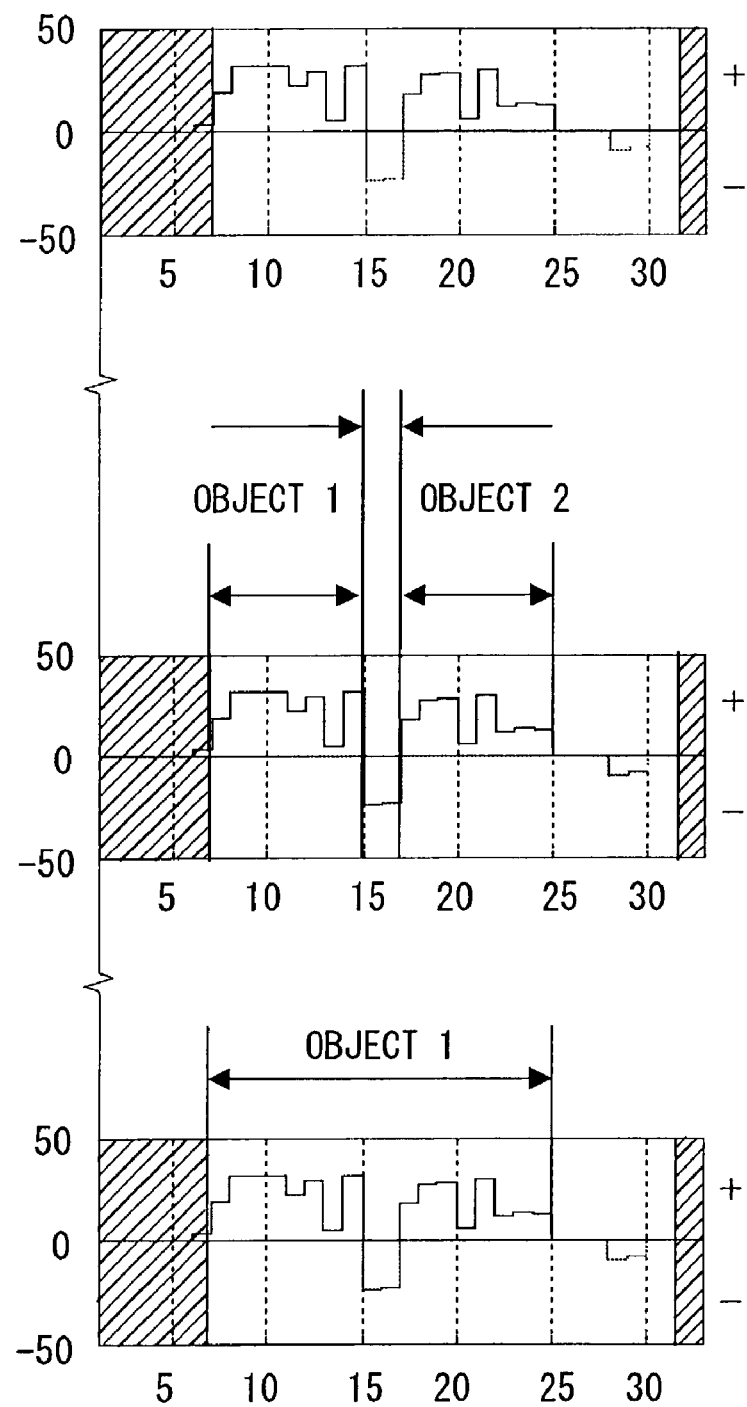
FIG. 10 is graphs for showing processing when an object is extracted from a relative speed.

Further, the invention is not limited to the above-described embodiment as mentioned above. For example, although according to the above-described embodiment, the relative position model and the relative speed model of the vehicle candidate range are estimated respectively, the relative position model may be estimated from the relative speed model. For example, as shown in FIG. 10, divisions indicating approach by the direction of the relative speed may be synthesized as objects from the relative speed model. And the relative position model may be estimated as object 1 and object 2. Further, when a distance between the objects is equal to or smaller than a predetermined value, the objects may be synthesized. That is, when the distance between the object 1 and the object 2 is equal to or smaller than the predetermined value as shown in FIG. 10, the object 1 and the object 2 may be synthesized as object 1 as shown in a lowermost stage of FIG. 10.

Further, the one-dimension setting means 20 may change a converting method based on data acquired by the acquiring means 24 (shown in FIG. 1A) that acquires data related to an object of taking the image. There are several converting methods. For instance, a method converts a pixel signal on a predetermined coordinate to a one-dimensional signal by a predetermined computing. Here, a desirable position where an obstacle is detected and an obstacle behavior can determine which pixel on a coordinate should be selected or how the pixel signal should be converted to the one-dimensional signal. For instance, when an obstacle probably traverses a certain line within the image, the range of the certain line can be converted to the one-dimensional signal.

Further the line setting means 21 may set the line using information from the navigation means 25 (shown in FIG. 1A), along with a parameter of the imaging means 11 and road construction data. Here, the navigation means 25 supplies a current position of an own vehicle and map information around the current position. This thereby increases accuracy of setting the line where an obstacle is present and determining the obstacle presence. When a center line of the contiguous lane is set as an obstacle presence line in rear and side recognition, the navigation means 25 can provide an accurate lane marker shape to enable accurate center line setting. When no contiguous lane is determined to be present by the navigation means, setting of the line may be avoided to prevent the wrong recognition.

Further, the line setting means 21 may set the line based on lane information detected by the lane recognizing means 26. The lane recognizing means 26 (shown in FIG. 1A), like the navigation means 25, can provide an accurate lane marker shape to enable accurate center line setting. The lane marker recognition is introduced in 'road lane marker recognition by model base recognition method' shingaku-giho PRMU99-211, pp.53–60.

Figure 3C:
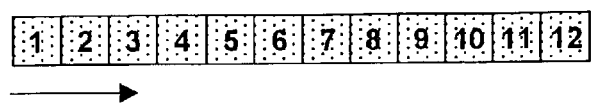

Further, the process setting means 23 may choose another method other than the one exemplified in FIG. 3B. For instance, the method may adopt a sequence of realigning the obstacle presence line in accordance with a city block distance from a reference pixel and pertinently thinning the aligned signal values to thereby constitute a one-dimensional signal. Here, the city block distance is equal to the sum of an X coordinate value and a Y coordinate value. For example, pixels described with numerals in FIG. 3B can be aligned in an order of the numerals as shown in FIG. 3C.

Further, in the correlation calculation by the speed model estimating means 52, another method of normalized correlation or the like may be used.

Further, frame synthesizing means 71 (FRAME SY) (shown in FIG. 1A) may be provided for promoting a detecting accuracy of the obstacle by synthesizing results of the obstacle detecting means 200 based on a plurality of frames provided by the above-described embodiment. For instance, the plurality of the frames extracted from images at different time points may be useful for promoting the detecting accuracy of the obstacle.

Further, line synthesizing means 72 (LINE SY) (shown in FIG. 1A) may be provided also for promoting a detecting accuracy of the obstacle. Here, the one-dimension extracting means 100 extracts a plurality of one-dimension signals from the image taken by the imaging means 11. The obstacle detection means 200 then determines presence of the obstacle with respect to each of the one-dimensional signals extracted by the one-dimension extracting means 100. The line synthesizing means 72 synthesizes results of the obstacle detection means 200 with respect to each of the one-dimensional signals to promote a detection accuracy of the obstacle.

Figure 1B:
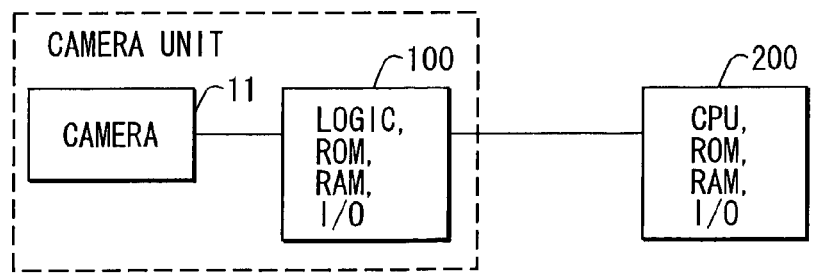

Further, as shown in FIG. 1B, a camera unit may be formed. It is integrally composed of a video camera as the imaging means 11 and the one-dimension extracting means 100 including a buffer or the like constituted by logics, ROM, RAM, I/O, peripheral circuit. Here, an image signal taken by the imaging means 11 is converted into a one-dimensional signal by the one-dimension extracting means 100. The converted one-dimensional signal is then transmitted to a microcomputer installed in a vehicle (for example, in-vehicle ECU) as the obstacle detecting means 200 via a communication line. Thereby, the signal transmitted by the communication line becomes the one-dimensional signal and a communication capacity can considerably be reduced compared with a case of transmitting an inputted two-dimensional signal to a microcomputer via a communication line as in the conventional example. Therefore, the communication line can be constituted as a comparatively low speed network and the obstacle monitoring device can be constituted inexpensively. Further, when for example, in-vehicle LAN is used as a communication line, an amount of occupying band of the vehicular LAN can be reduced and influence on another communication via the in-vehicle LAN can be restrained. Further, when the line is set in such a structure, the buffer of the one-dimension extracting means 100 may set the line in accordance with instruction from the obstacle detecting means 200 via the communication line.

What is claimed is:

1. An obstacle monitoring device comprising:
   imaging means for taking an image of a predetermined area;
   one-dimension extracting means for extracting a one-dimensional signal from the image; and
   obstacle detecting means for determining presence or absence of an obstacle based on the one-dimensional signal,
   wherein the one-dimension extracting means includes:
      one-dimension setting means for setting a method of converting the image taken by the imaging means into the one-dimensional signal; and
      one-dimension generating means for converting the image into the one-dimensional signal in accordance with the converting method set by the one-dimension setting means,
   wherein the one-dimension setting means includes:
      line setting means for setting a suspected line on which an obstacle is suspected to be present; and
      process setting means for setting, based on a pixel on the suspected line, the converting method to be adopted by the one-dimension generating means; and
   data detecting means for detecting a speed and a steering angle of an own vehicle where the obstacle monitoring device is provided,
   wherein the line setting means adjusts the suspected line in accordance with the speed and the steering angle of the own vehicle detected by the data detecting means.

2. An obstacle monitoring device comprising:
   imaging means for taking an image of a predetermined area;
   one-dimension extracting means for extracting a one-dimensional signal from the image; and
   obstacle detecting means for determining presence or absence of an obstacle based on the one-dimensional signal,
   wherein the one-dimension extracting means includes:
      one-dimension setting means for setting a method of converting the image taken by the imaging means into the one-dimensional signal; and
      one-dimension generating means for converting the image into the one-dimensional signal in accordance with the converting method set by the one-dimension setting means,
   wherein the one-dimension setting means includes:
      line setting means for setting a suspected line on which an obstacle is suspected to be present; and
      process setting means for setting, based on a pixel on the suspected line, the converting method to be adopted by the one-dimension generating means; and
   navigation means for calculating a current position and map information around the current position, wherein the line setting means sets the suspected line based on the current position and the map information around the current position calculated by the navigation means.

3. An obstacle monitoring device comprising:
   imaging means for taking an image of a predetermined area;
   one-dimension extracting means for extracting a one-dimensional signal from the image; and
   obstacle detecting means for determining presence or absence of an obstacle based on the one-dimensional signal,
   wherein the obstacle detecting means includes:
      range modeling means for estimating an obstacle candidate range in which the obstacle is estimated to be present based on a change of a signal value of the one-dimensional signal extracted by the one-dimension extracting means;
      speed modeling means for estimating a relative speed at a respective point of the one-dimensional signal based on a correlation of two of the one-dimensional signals at different time points extracted by the one-dimension extracting means; and
      obstacle determining means for determining the obstacle by using the obstacle candidate range estimated by the range modeling means and the estimated relative speed by the speed modeling means,
   wherein the speed modeling means is composed of:
      speed converting means for converting two of the one-dimensional signals at the different time points extracted by the one-dimension extracting means into the one-dimensional signals emphasizing a difference between the obstacle candidate range and other range; and
      speed model estimating means for estimating the relative speed at the respective point of the one-dimensional signal based on a correlation of two of the one-dimensional signals at different time points converted by the speed converting means,
   wherein the speed converting means converts the one-dimensional signal extracted by the one-dimension extracting means into a one-dimensional signal expressing only the obstacle candidate range by masking a background range.

4. An obstacle monitoring device comprising:
   imaging means for taking an image of a predetermined area;
   one-dimension extracting means for extracting a one-dimensional signal from the image; and
   obstacle detecting means for determining presence or absence of an obstacle based on the one-dimensional signal,
   wherein the obstacle detecting means includes:
      range modeling means for estimating an obstacle candidate range in which the obstacle is estimated to be present based on a change of a signal value of the one-dimensional signal extracted by the one-dimension extracting means;
      speed modeling means for estimating a relative speed at a respective point of the one-dimensional signal based on a correlation of two of the one-dimensional signals at different time points extracted by the one-dimension extracting means; and
      obstacle determining means for determining the obstacle by using the obstacle candidate range estimated by the range modeling means and the estimated relative speed by the speed modeling means,
   wherein the range modeling means is comprised of:
      range converting means for converting the one-dimensional signal extracted by the one-dimension extracting means into a one-dimensional signal emphasizing a difference between the obstacle candidate range and the other range based on the change of the signal value; and range model estimating means for estimating the obstacle candidate range based on the change of the signal value of the one-dimensional signal converted by the range converting means.

5. An obstacle monitoring device according to claim 4, wherein the range converting means converts the one-dimensional signal extracted by the one-dimension extracting means into a one-dimensional signal expressing only the obstacle candidate range by masking a background range.

* * * * *